(12) United States Patent
Bickford et al.

(10) Patent No.: US 8,839,165 B2
(45) Date of Patent: *Sep. 16, 2014

(54) POWER/PERFORMANCE OPTIMIZATION THROUGH CONTINUOUSLY VARIABLE TEMPERATURE-BASED VOLTAGE CONTROL

(71) Applicant: International Business Machines Corporation, Armonk, NY (US)

(72) Inventors: Jeanne P. Bickford, Essex Junction, VT (US); Eric A. Foreman, Fairfax, VT (US); Mark W. Kuemerle, Essex Junction, VT (US); Susan K. Lichtensteiger, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,925

(22) Filed: Jan. 25, 2013

(65) Prior Publication Data

US 2014/0215429 A1 Jul. 31, 2014

(51) Int. Cl.
*G06F 17/50* (2006.01)

(52) U.S. Cl.
CPC ................ *G06F 17/5036* (2013.01)
USPC ........... 716/106; 716/107; 716/108; 716/109; 716/110; 716/111; 716/112; 716/113; 716/132; 716/134; 716/136; 703/13; 703/14

(58) Field of Classification Search
USPC .................. 716/106–113, 132–134, 136; 703/13–14
See application file for complete search history.

(56) References Cited

U.S. PATENT DOCUMENTS

| | | | |
|---|---|---|---|
| 5,084,824 | A | 1/1992 | Lam et al. |
| 5,974,247 | A | 10/1999 | Yonezawa |
| 6,452,454 | B1 | 9/2002 | Shapiro et al. |
| 7,024,647 | B2 * | 4/2006 | Wen .............................. 716/113 |
| 7,475,366 | B2 * | 1/2009 | Kuemerle et al. ............. 716/134 |
| 7,653,888 | B2 | 1/2010 | Habib et al. |
| 7,714,635 | B2 | 5/2010 | Singh et al. |
| 7,941,779 | B2 | 5/2011 | Rahmat et al. |
| 7,958,478 | B2 | 6/2011 | Saito et al. |
| 2004/0025136 | A1 * | 2/2004 | Carelli, Jr. ...................... 716/17 |

(Continued)

OTHER PUBLICATIONS

U.S. Patent Office Communication, U.S. Appl. No. 13/749,851, dated Jan. 9, 2014, pp. 1-10.

(Continued)

*Primary Examiner* — Nghia Doan
(74) *Attorney, Agent, or Firm* — Gibb & Riley, LLC; Richard Kotulak, Esq.

(57) ABSTRACT

Methods determine temperature and voltage relationships for integrated circuit library elements to produce a continuous temperature-voltage function. Some of the library elements can be used or combined to form an integrated circuit design. Further, the performance characteristics for integrated circuit chips produced according to the integrated circuit design can be defined, such performance characteristics include an operating temperature range, etc. The continuous temperature-voltage function is applied to the performance characteristics to determine a plurality of temperature/voltage combinations for the integrated circuit chips. Each of the temperature/voltage combinations comprises an operating voltage for each operating temperature within the operating temperature range of the integrated circuit chips. Next, the integrated circuit chips are produced according to the integrated circuit design. The temperature/voltage combinations are recorded in memory of the integrated circuit chips.

20 Claims, 15 Drawing Sheets

(56) References Cited

U.S. PATENT DOCUMENTS

2009/0019408 A1 1/2009 Saito et al.
2009/0228843 A1 9/2009 Anemikos et al.
2010/0095259 A1 4/2010 Tetelbaum
2011/0163801 A1 7/2011 Chua-Eoan

OTHER PUBLICATIONS

Office Action Communication, U.S. Appl. No. 13/749,925, dated Nov. 15, 2013, pp. 1-17.
Office Action Communication, U.S. Appl. No. 13/749,925, dated Apr. 7, 2014, pp. 1-12.

* cited by examiner

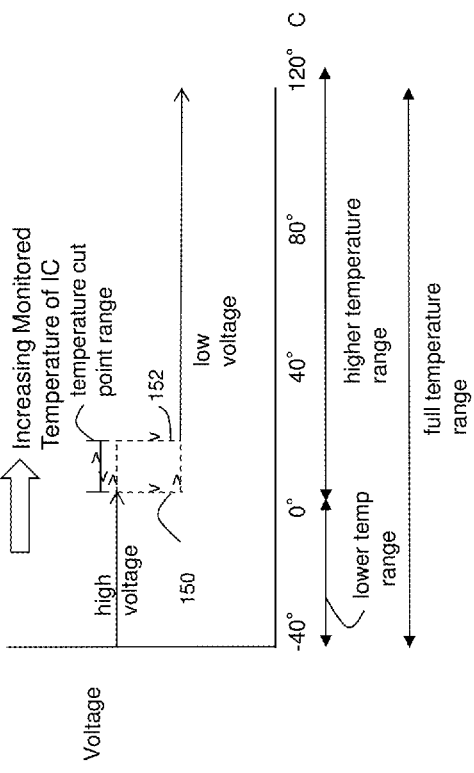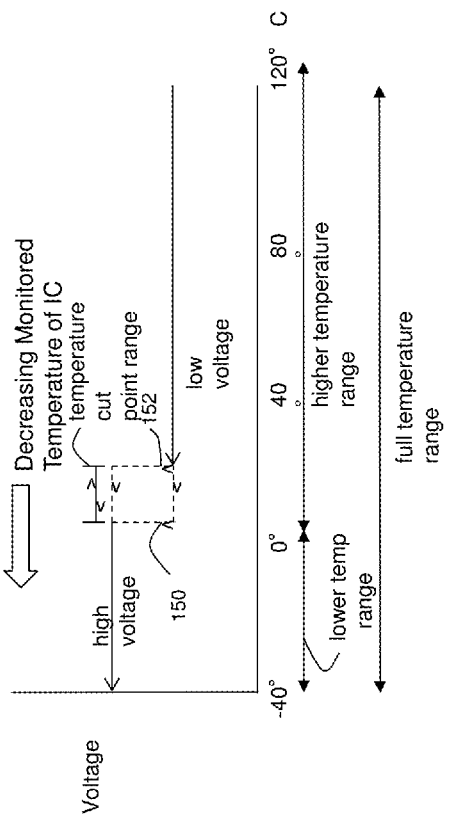

POWER/PERFORMANCE OPTIMIZATION THROUGH CONTINUOUSLY VARIABLE TEMPERATURE-BASED VOLTAGE CONTROL

BACKGROUND

1. Field of the Invention

The disclosure generally relates to power and timing optimization of an integrated circuit (IC) chip, using an IC technology that exhibits temperature inversion, by modifying a voltage supplied to the IC chip, while meeting power consumption and timing delay performances across lower and higher temperature ranges.

2. Description of Related Art

Manufacturers of integrated circuits (ICs) seek to reduce not only the size of ICs, but also their power consumption. Power consumption of digital integrated circuits consists of two components: dynamic power consumption, associated with active operation of the circuit; and static power consumption, associated with leakage current when the circuit is inactive. Dynamic power consumption refers to the amount of power required to operate a digital circuit, e.g., a logic circuit or latch, and is proportional to value of the supply voltage squared and the frequency of operation. Static power consumption refers to the amount of power consumed by the digital circuit when it is inactive, and is an exponential function of the digital circuit's temperature and voltage.

Digital ICs frequently include a number of standard cells, i.e., standardized digital IC logic circuits or latches, which are characterized by cell libraries. The cell libraries of, for example, a Liberty model, are used during the design phase for the digital ICs and store various operating parameters, e.g., voltage, temperature, timing delay and power consumption ranges.

During the design phase of an IC chip, the cells and their interconnecting pathways may be analyzed in a multidimensional parameterized space, which includes voltage and temperature parameters, to provide a closed timing analysis for the IC chip. A timing performance, as measured by a timing delay, is selected for the IC design from the closed timing analysis.

The manufacture of IC chips to a single IC chip design will result in timing variations among the manufactured IC chips that result from variations of manufacturing process parameters, e.g., chemical mechanical polishing, optical proximity effects, random dopant effects, line-edge roughness, dose and focus variation. Variations in the manufacturing processes can introduce timing variations across chips of a single wafer or across chips from different wafers. Thus, in a population of IC chips manufactured to a single IC chip design, there will be a statistical distribution of subpopulations of IC chips that show smaller timing delays, i.e., fast IC chips, and larger timing delays, i.e., slow IC chips.

During operation, cells of IC chips manufactured from IC technologies, which exhibit temperature inversion, are associated with a negative coefficient of delay with respect to temperature. Thus, as temperatures increase for the cells of an IC chip exhibiting temperature inversion, the timing delay becomes smaller. In contrast, IC chips manufactured from IC technologies, which do not exhibit temperature inversion, show greater timing delays with increasing temperature.

At lower temperatures, cells of an IC chip using an IC technology that shows temperature inversion will have a greater timing delay. When supplied with a low driving voltage, these IC chips may not meet a timing delay performance. To meet a requirement for the timing delay performance, the IC chips can be driven at a high voltage at the lower temperatures. However, driving the IC chips at a high voltage results in increased dynamic and static power consumption. Alternatively, only those IC chips having a sufficiently high performance at the lower temperatures may be selected from a population of manufactured IC chips to meet the timing delay performance. This selection necessarily results in a smaller number of IC chips that are available.

At higher temperatures, cells using an IC technology that shows temperature inversion will show both increased dynamic and static power consumption, because voltage needs to be raised in order to meet performance at low temperature. This increased voltage causes higher active and leakage power.

SUMMARY

Various methods herein determine temperature and voltage relationships for integrated circuit library elements to create a three-dimensional model for temperature, voltage, and performance to produce a continuous temperature-voltage function, using a computerized device. Some of the library elements can be used or combined to form an integrated circuit design, using the computerized device. Further, the performance characteristics for integrated circuit chips produced according to the integrated circuit design can be defined, using the computerized device. Such performance characteristics include an operating temperature range, etc.

The continuous temperature-voltage function is applied to the performance characteristics to determine a plurality of temperature/voltage combinations for the integrated circuit chips. Each of the temperature/voltage combinations comprises an operating voltage for each operating temperature within the operating temperature range of the integrated circuit chips.

Next, the integrated circuit chips are produced according to the integrated circuit design using manufacturing equipment operatively connected to the computerized device. The temperature/voltage combinations are recorded in memory of the integrated circuit chips.

The methods herein can calculate for each of the temperature/voltage combinations, a power consumption amount, and determine the amount of time each of the integrated circuit chips will be operating at each different operating voltage. This allows these methods to calculate the average system power, using the computerized device, based on the amount of time each of the integrated circuit chips will be operating at each different operating voltage, and the power consumption amount at each of the different operating voltages.

Another method herein determines temperature and voltage relationships for each process window bin for all library elements in a technology to create a three-dimensional model for temperature, voltage, and performance to produce a continuous temperature-voltage function, using a computerized device. Some of the library elements can be used or combined to form an integrated circuit design conforming with the technology, using the computerized device. Further, the number of voltage bins into which integrated circuit chips produced according to the integrated circuit design will be sorted can be defined, using the computerized device. The performance characteristics for each of the voltage bins can be identified. Such performance characteristics include an operating temperature range, etc.

The continuous temperature-voltage function is applied to the performance characteristics for each voltage bin to determine a plurality of temperature/voltage combinations for each voltage bin. Each of the temperature/voltage combinations comprises a minimum operating voltage for each operating temperature within the operating temperature range of each of the voltage bins. This method then calculates for each of the temperature/voltage combinations of each of the voltage bins, a power consumption amount using the computerized device Next, the integrated circuit chips are produced according to the integrated circuit design using manufacturing equipment operatively connected to the computerized device. Such integrated circuit chips are then tested (using testing equipment operatively connected to the computerized device) and sorted into the voltage bins based on the testing. Once sorted, the temperature/voltage combinations of the corresponding voltage bin into which each of the integrated circuit chips has been sorted is recorded in memory of the integrated circuit chips.

The methods herein can determining the percentage of integrated circuit chips sorted into each of the voltage bins, and determine the amount of time each of the integrated circuit chip will be operating at each different operating voltage. This allows these methods to calculate the average system power, using the computerized device, based on the percentage of the integrated circuit chips sorted into each of the voltage bins, the amount of time each of the integrated circuit chip will be operating at each different operating voltage, and the power consumption amount at each different operating voltage of each of the voltage bins.

Each of the integrated circuit chips alters the current operating voltage during in-service operations based on a current operating temperature and the temperature/voltage combinations stored in their memory. The total power consumption of each of the integrated circuit chips comprises the sum of dynamic power consumption and static power consumption.

The systems and methods herein will be better understood from the following detailed description with reference to the drawings, which are not necessarily drawn to scale and in which:

FIG. 5 is a schematic diagram illustrating a high voltage being lowered to a low voltage for an IC chip exhibiting temperature inversion at a temperature cut point as the temperature of the IC chip increases in an exemplary system and method;

FIG. 6 is a schematic diagram illustrating a low voltage being increased to a high voltage for an IC chip exhibiting temperature inversion at a temperature cut point as the temperature of the IC chip decreases in an exemplary system and method;

DETAILED DESCRIPTION

Figure 1:
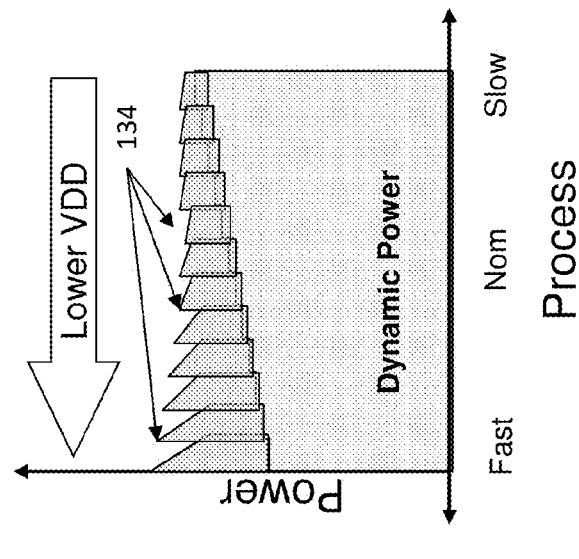
FIG. 1 is a chart illustrating the relationship between process speed and power usage for integrated circuits manufactured with the same process.

The exemplary systems and methods of the disclosure and their various features and advantageous details are explained more fully with reference to the non-limiting exemplary systems and methods that are illustrated in the accompanying drawings and detailed in the following description. It should be noted that the features illustrated in the drawings are not necessarily drawn to scale. Descriptions of well-known materials, components, and processing techniques are omitted so as to not unnecessarily obscure the exemplary systems and methods of the disclosure. The examples used herein are intended to merely facilitate an understanding of ways in which the exemplary systems and methods of the disclosure may be practiced and to further enable those of skill in the art to practice the exemplary systems and methods of the disclosure. Accordingly, the examples should not be construed as limiting the scope of the exemplary systems and methods of the disclosure.

Systems and methods herein optimize power and timing of an integrated circuit (IC) chip, using an IC technology that exhibits temperature inversion, by modifying a voltage supplied to the IC chip, while meeting power consumption and timing delay performances across lower and higher temperature ranges.

Various exemplary systems and methods of the disclosure may take advantage of the negative temperature coefficient for a timing delay exhibited by a IC chip, by selecting a high voltage to be supplied to the IC chip over a lower temperature range to overcome a poor timing delay performance, while meeting a power consumption performance, and by selecting a low voltage to be supplied to the IC chip over a higher temperature range to reduce increased power consumption, while meeting the timing delay performance.

Figure 2:
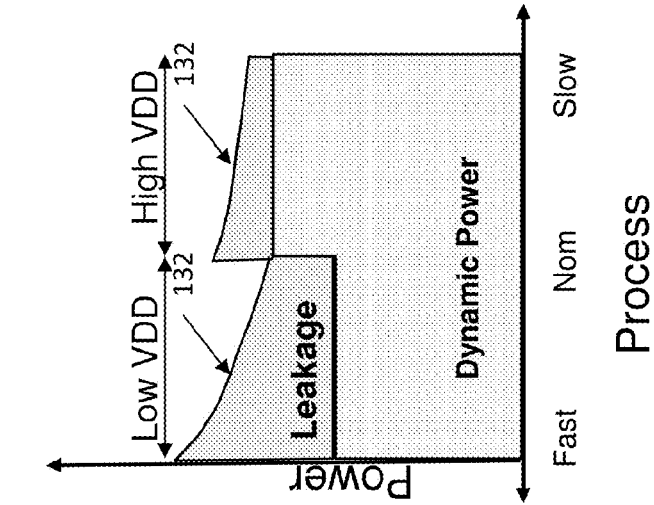
FIG. 2 is a chart illustrating the relationship between process speed and power usage for integrated circuits manufactured with the same process using a 2-bin selective binning process.
Figure 3:
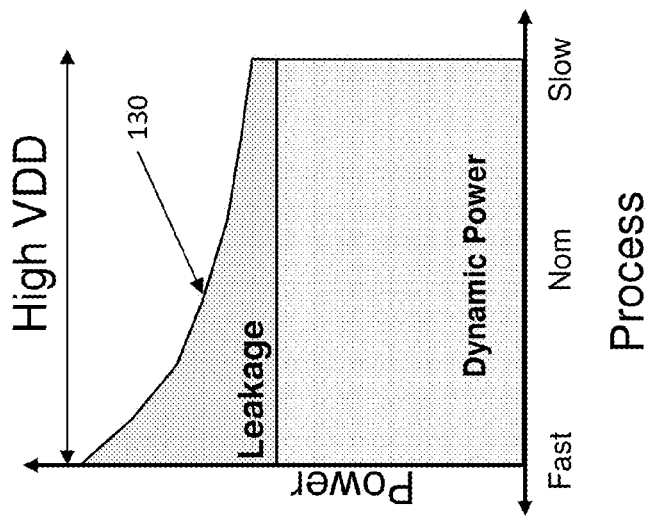
FIG. 3 is a chart illustrating the relationship between process speed and power usage for integrated circuits manufactured with the same process using a multi-bin selective binning process.

FIG. 1 is a chart illustrating the relationship between process speed and power usage for identically manufactured integrated circuit devices. FIG. 2 is a chart illustrating the relationship between process speed and power usage for integrated circuits manufactured with the same process using a 2-bin selective binning process, and FIG. 3 is a chart illustrating the relationship between process speed and power usage for integrated circuits manufactured with the same process using a multi-bin selective binning process.

Post-manufacturing voltage binning is a technique that is used to sort manufactured chips into bins based on whether they were fabricated at either the "slow" end or the "fast" end of a process distribution, and to vary the voltage requirements for the chips depending upon the bins they are assigned to in order to reduce maximum chip power. For example, FIG. 1 is a diagram illustrating the dynamic power and process speed for chips that are manufactured from a common design, but that are different because of different processing conditions that occur within acceptable manufacturing tolerances.

In FIG. 1, the fast-case process range on curve 130 drives the required voltage for ultimately running the chip, creating an unnecessarily high operating voltage. However, with selective voltage binning shown in FIGS. 2 and 3, every chip is tested to measure operating speed and the chips are sorted into voltage bins accordingly. This reduces maximum chip power by running fast process chips at lower Vdd, as shown by curves 132 and 134. Thus, the devices are binned by process, and slow chips are operated at standard Vdd without change to slow-corner voltage, timing, and power (because slow-corner power is not limiting). However, as shown in FIGS. 2-3, fast chips are operated at reduced Vdd because the fast chips have speed to spare, and at reduced Vdd, power is reduced.

For example, in a process-voltage-temperature space, the temperature and voltage of the chip may be fixed and the leakage may be measured. If the leakage is above a specific cut point, then the chip is on the fast end of the process-voltage-temperature space and placed in a fast chip bin. If the leakage is below the cut point, then the chip is on the slow end of the process-voltage-temperature space and placed in a slow chip bin. After the chips are sorted into bins according to the cut point, an optimal supply voltage (Vdd) for operating the chips in each bin is determined.

Figure 4:
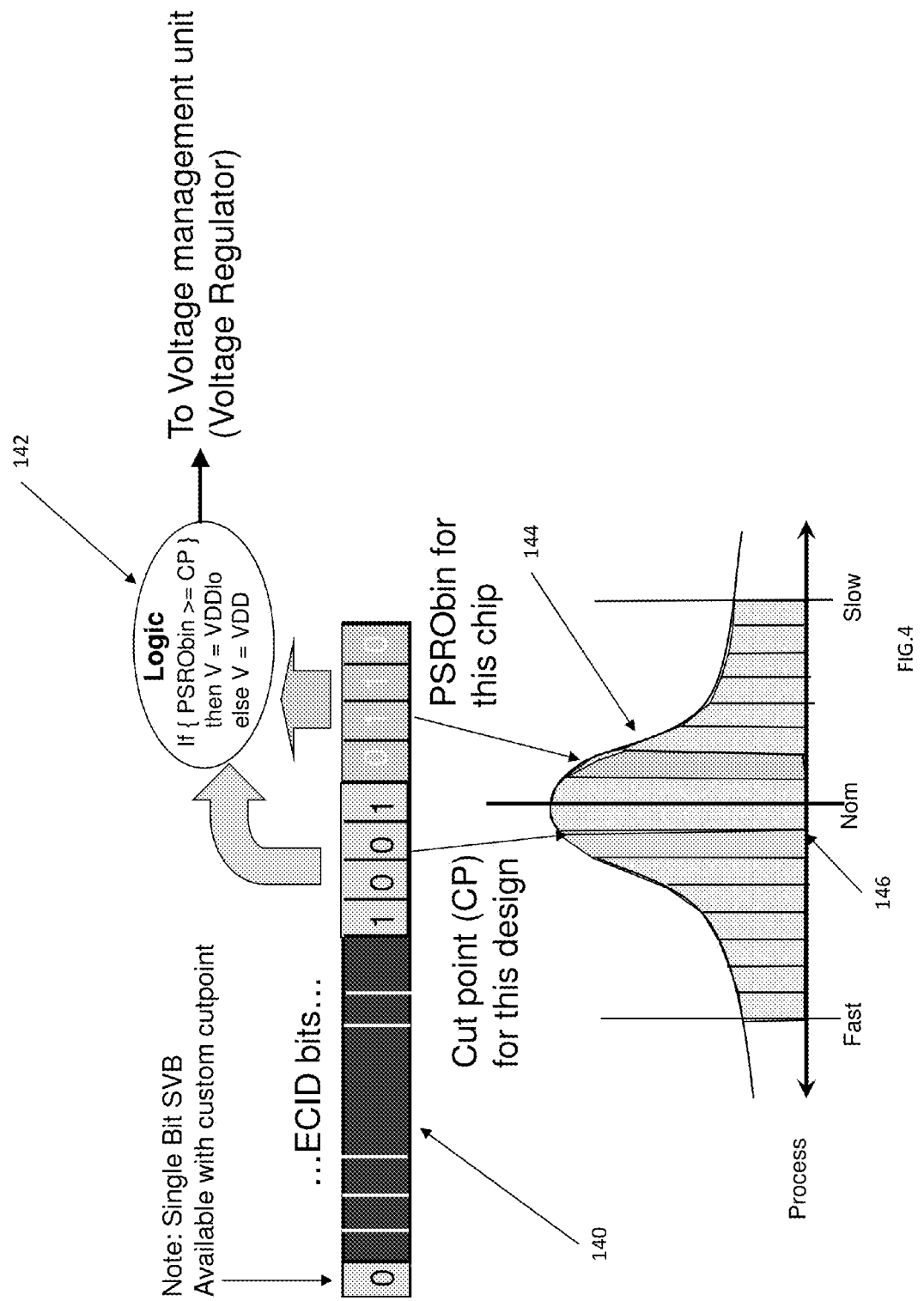
FIG. 4 is a chart illustrating the cut points of selective voltage binning.

In FIG. 4, item 146 represents the selective voltage binning (SVB) cut point between what is considered to be a fast device and what is considered to be a slow device along curve 144. The fast devices will sorted into the "fast" bin and will be utilized at lower voltages than the slow devices that are sorted into the "slow" bin. The fast devices will consume more power if operated at the standard, non-lowered voltage.

In FIG. 4, item 140 represents the electronic chip identification data (ECID) that will be stored on the chip. Thus, the ECID value is burned into the device based on process, the customer reads the ECID (which can be tied to an input/output (IO)) to determine voltage levels on board, and the customer handles setting power supply voltages differently based upon ECID value. Further, timing closure runs are adjusted for SVB. Thus, item 140 defines the "performance sorting ring oscillator" (PSRO)) and current leakage criteria for a particular bin on each part. Part of this information includes the identification of the cut point use by logic 142 to supply information to the voltage management unit (voltage regulator). As shown in FIG. 4 the logic 142 can alter the voltage at which the specific device operates.

FIG. 5 schematically illustrates the operation of an IC chip, which exhibits temperature inversion, as the temperature of the IC chip increases over a full temperature range, extending from a lowest possible operating temperature to a highest possible operating temperature in an exemplary system and method. A closed timing analysis over a multidimensional parameterized space may provide a high voltage that meets a selected timing delay performance for the IC chip over a lower temperature range, which is associated with the major portion of the impact of temperature inversion, while meeting a power consumption performance. However, as the temperature increases to a higher temperature range for the IC chip at the high voltage, the power consumption may increase beyond that associated with the highest value of power consumption for the lower temperature range. Lowering the high voltage supplied to the IC chip at a temperature cut point 150 may reduce the higher power consumption within the higher temperature range, while still meeting the timing delay performance. Thus, temperature cut point 150 may represent the lowest temperature within the higher temperature range, where the high voltage may be lowered and still meet the timing delay performance.

The high voltage supplied to the IC chip at temperatures higher than that of the temperature cut point 150 may be maintained over a range of temperature cut points that meet both the timing delay and power consumption performances. As the temperature increases beyond the temperature cut point 150, power consumption increases until at temperature cut point 152, the power consumption performance may be exceeded. Thus, temperature cut point 152 may represent the highest temperature of the range of temperature cut points, where the high voltage must be lowered to meet the power consumption performance. The temperature cut point range, which extends from the temperature cut point 150 to the temperature cut point 152, meets both the timing delay and power consumption performances for the IC chip with either the high or low supply voltages.

FIG. 6 schematically illustrates the operation of an IC chip, which exhibits temperature inversion, as the temperature of the IC chip decreases over a full temperature range, extending from a highest possible operating temperature to a lowest possible operating temperature in an exemplary system and method. As the temperature decreases over the higher temperature range, temperature cut point 120 may now represent lowest temperature in the higher temperature range, where either the low or the high supply voltage may meet the power consumption performance, while still meeting the timing performance, and temperature cut point 110 may represent lowest temperature of the higher temperature range, where the low voltage must be increased to the high voltage to meet the timing delay performance.

Figure 7:
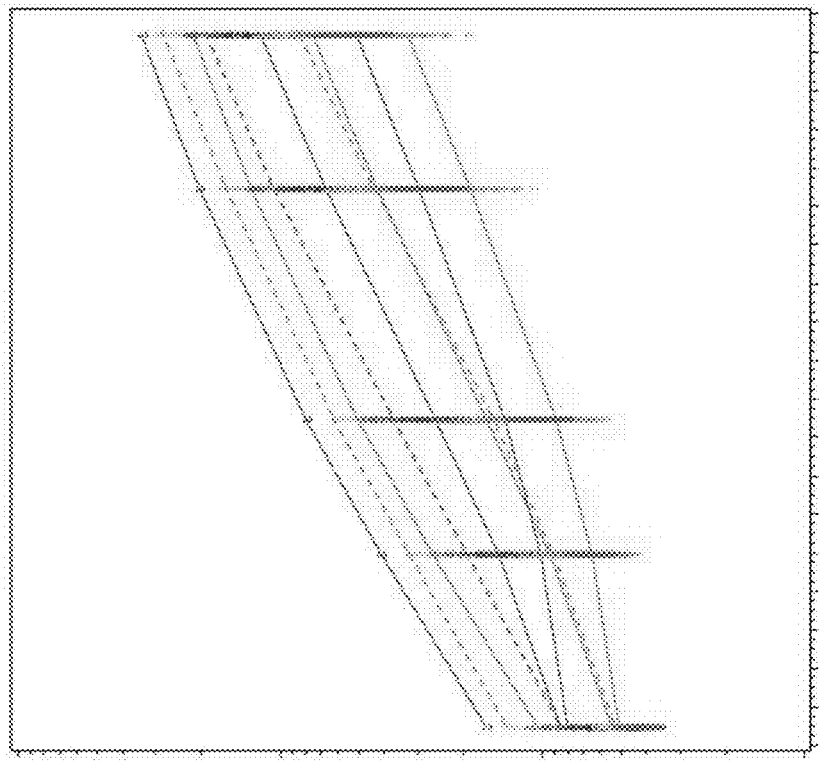
FIG. 7 is a graph showing multiple current leakage curves within various integrated circuits at different temperatures.

FIG. 7 is a graph showing multiple current leakage curves within various integrated circuits at different temperatures. FIG. 7 demonstrates the leakage impact on total power at high temperatures. Leakage is becoming a more dominant factor in many designs at smaller geometry nodes, and temperature has a dramatic impact on leakage and energy efficiency. Further, as shown in FIG. 7, because leakage is higher at higher temperatures, using a higher operating voltage at lower temperatures is helpful to meet performance and does not impact maximum power.

Figures 8, 9, 10:
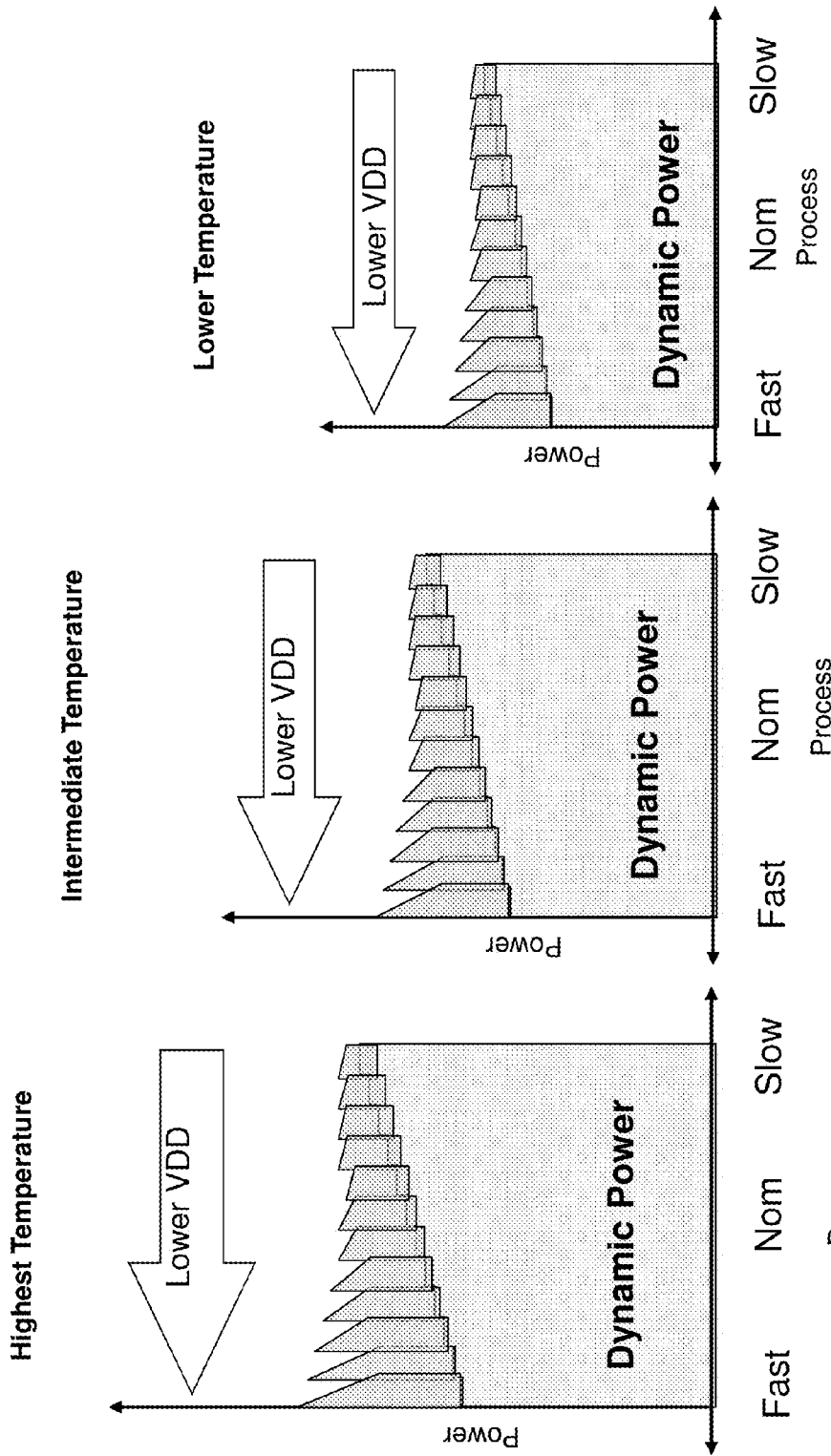
FIG. 8 is a schematic diagram that demonstrates that selective voltage bins change based on different operating temperatures.
FIG. 9 is a schematic diagram that demonstrates that selective voltage bins change based on different operating temperatures.
FIG. 10 is a schematic diagram that demonstrates that selective voltage bins change based on different operating temperatures.

Additionally, FIGS. 8-10 demonstrate that the selective voltage bins (shown in FIG. 3, above) change based on different operating temperatures. More specifically, FIG. 8 represents bins at a relatively high temperature, FIG. 9 represents the same bins at a relatively lower temperature (an intermediate temperature), and FIG. 9 represents the same bins at an even lower (relatively low) temperature.

Figures 11, 12:
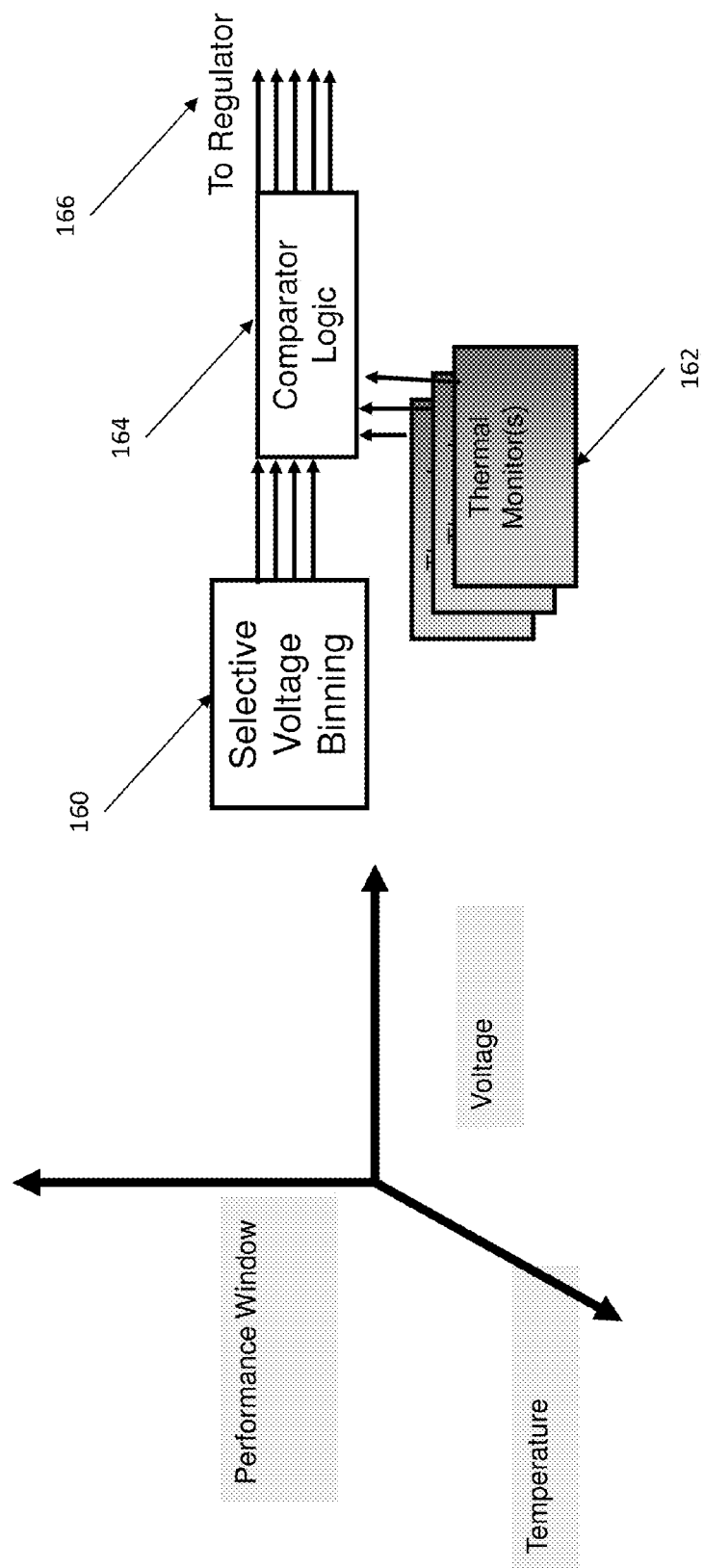
FIG. 11 is a schematic drawing that illustrates consideration of the process window (timing), the operating voltage and the operating temperature.
FIG. 12 is a schematic drawing that shows thermal monitors that are included in a product design.

FIG. 11 is a schematic drawing that illustrates that the systems and methods herein consider the process window (timing), the operating voltage, and the operating temperature when determining the appropriate operating voltage that will achieve timing delay and power consumption performance goals.

The methods and systems herein characterize a library and design system across the entire allowed power range. In doing so, the methods and systems herein identify the allowed voltages for each temperature, close the timing at temperatures and voltages allowed for use. FIG. 12 is a schematic drawing that shows thermal monitors 162 that are included in product design. Additionally, the selective voltage binning discussed above is shown conceptually as item 160. Such thermal monitors monitor temperature of the integrated circuit chip to which they are attached, and communicate with the comparator logic 164 to control a voltage regulator 166 to continuously change the operating voltage of the integrated circuit chip in response to temperature changes. If desired, such processing can be used with selective voltage binning (above process set up for each SVB bin).

Figure 13:
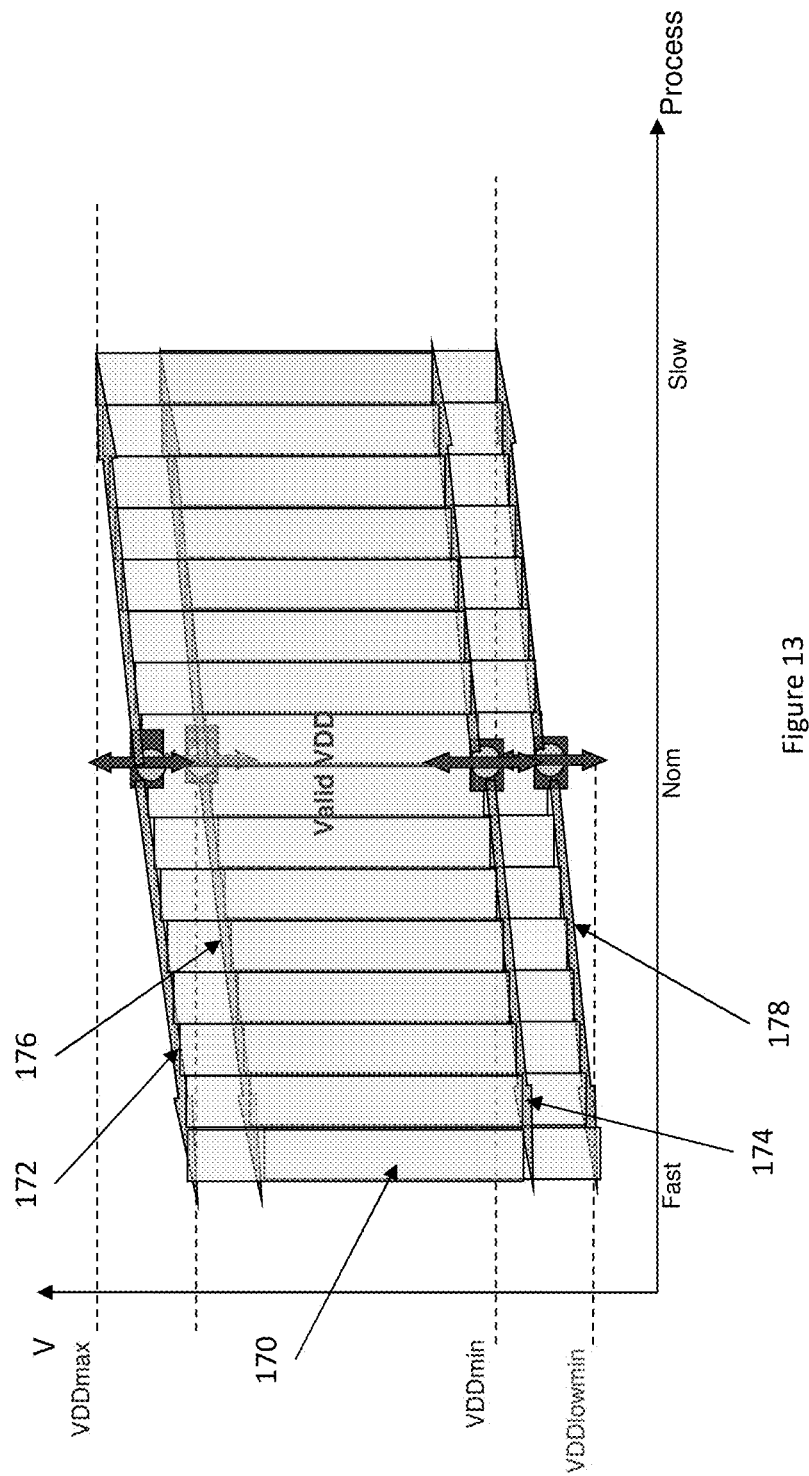
FIG. 13 is a chart illustrating a temperature compensation timing analysis.

FIG. 13 is a chart illustrating a temperature compensation timing analysis that compares voltage (maximum operating voltage (VDDmax); minimum operating voltage (VDDmin); and even lower "low" minimum operating voltage (VDDlowmin)) for many different voltage bins (represented by rectangles 170 in FIG. 13). As can be seen by different operating voltage ranges of the different voltage bins 170 in FIG. 13, the integrated circuit chips in the slower bins 170 (those to the right in FIG. 13) can be operated at a higher operating voltage range relative to the integrated circuit chips in the faster bins 170 (those to the left in FIG. 13).

Further, depending upon the current operating temperature of the integrated circuit chips, the operating voltage range will be relatively higher at lower temperatures (represented by lower-temperature double arrow lines 172, 174) and the operating voltage range will be relatively lower at higher temperatures (represented by higher-temperature double arrow lines 176, 178). Again, such maximum operating voltages 172, 176 are relatively higher for slower bins 170 (those to the right in FIG. 13) and, such minimum operating voltages 174, 178 are also relatively higher for slower bins 170 (those to the right in FIG. 13); and for both the faster bins 170 (to the left in FIG. 13) have relatively lower maximum and minimum operating voltages.

In this process slack projection is performed at every process corner to ensure a correct timing for every selective voltage bin. In the example shown in FIG. 13, a +/−20 degree margin is utilized in initial runs to compensate for timing variation (ODTV). The initial support is found via multiple runs before the final signoff. Then the methods and devices herein refine the analysis with actual timing (Tj) analysis results to reduce margin during final timing.

The methods and devices herein perform a bound timing analysis to account for maximum thermal variation across the integrated circuit chip. Thus, the methods and devices herein capture the worst expected on-chip thermal variation to determine correct process corners for timing runs. Also, the slope of temperature change and system level response to elevated temperatures is considered by the methods and devices herein.

For given timing delay and power consumption performances, the range of continuous temperature-voltage functions for an IC chip exhibiting temperature inversion will be the same for increasing and decreasing temperatures. However, the selection of a particular continuous temperature-voltage function for rising temperatures need not be the same as that for decreasing temperatures. As a first continuous temperature-voltage function for rising temperatures will be associated with a transition from a high to a low supply voltage in the IC chip, whereas a second continuous temperature-voltage function for decreasing temperatures will be associated with a transition from a low to a high supply voltage, a simple logic circuit may affect the supply voltage transitions at the first and second continuous temperature-voltage functions.

The method that optimizes power and timing by modifying a voltage supplied to each of a population of integrated circuit (IC) chips, while meeting power consumption and timing delay performances for each of said population of IC chips across lower and higher temperature ranges.

Figure 14:
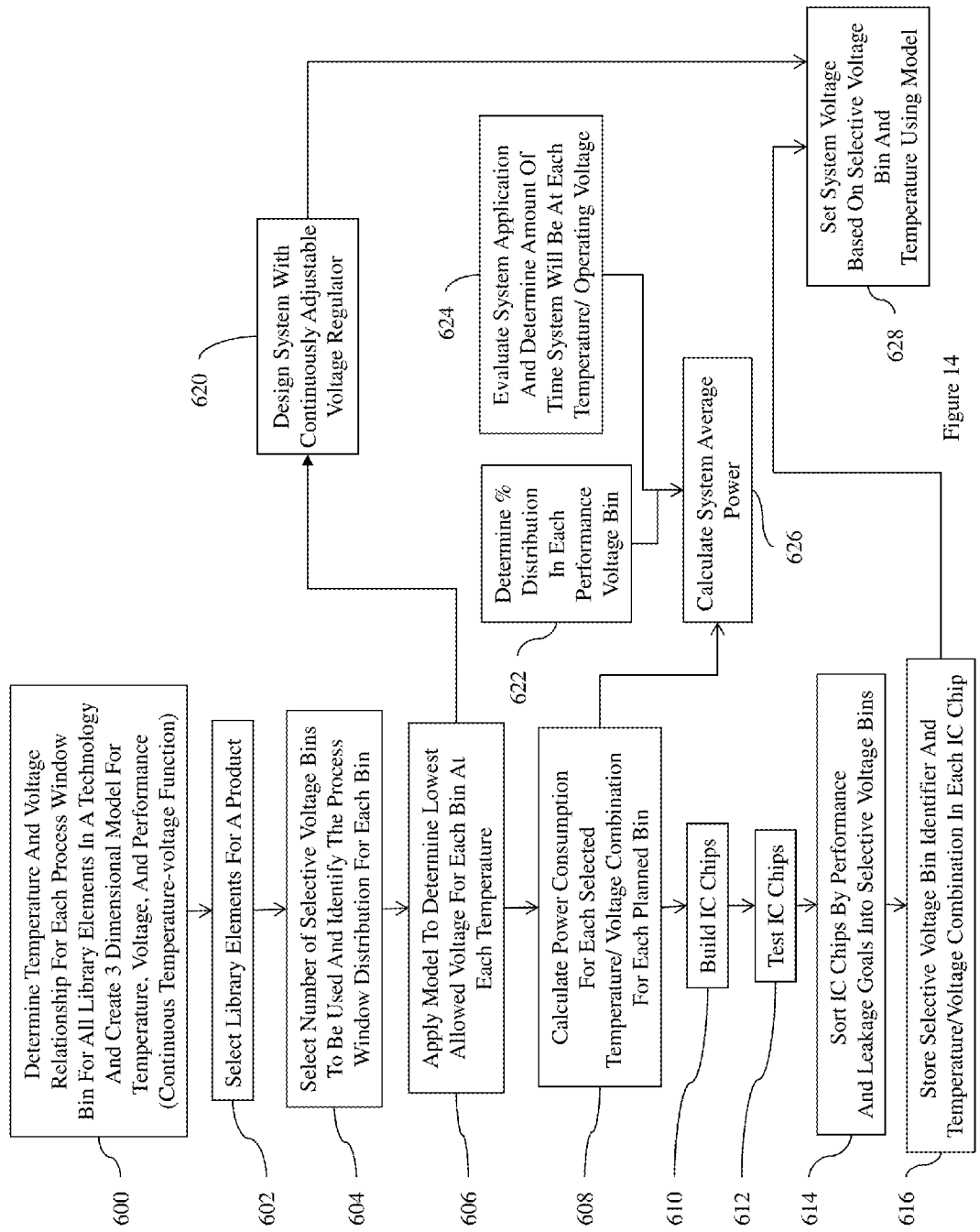
FIG. 14 is a flowchart illustrating a method of systems and methods herein.

As also shown in flowchart form in FIG. 14, one method herein begins by determining the temperature and voltage relationship for many different process window bins for all library elements in a technology in order to create a three-dimensional model for temperature, voltage, and performance (item 600). Such a model is sometimes referred to herein as a continuous temperature-voltage function. The integrated circuit chips produced according to such a technology may exhibit temperature inversion, meaning such chips have decreasing timing delay (such chips speed up) as operating temperature increases.

Then, in item 602, the method selects library elements for a design of a product (such as an integrated circuit chip). Additionally, in item 604, the method selects the number of selective voltage bins into which the integrated circuit chip produced will be sorted, and identifies or defines the process window distribution (performance characteristics) for each such voltage bin selected. Each different voltage bin represents a segment of the allowed process window. Therefore, each different voltage bin has different performance characteristics that can include, for example, an allowed timing delay (operating speed) range, an allowed operating temperature range, etc. Each of the integrated circuit chips will optionally be assigned to or sorted into one of the selective voltage bins after manufacture, based on ring oscillator measurements that correlate with the timing delay of the integrated circuit chips.

The method also applies the continuous temperature-voltage function to the performance characteristics to determine the minimum operating voltage for each allowed operating temperature, within each selective voltage bin (in item 606). Thus, item 606 applies the continuous temperature-voltage function to the performance characteristics for each voltage bin to determine a plurality of temperature/voltage combinations for each voltage bin. Each of the temperature/voltage combinations comprises a minimum operating voltage for each allowed operating temperature within the allowed temperature range of each of the voltage bins. The temperature/voltage combinations direct each integrated circuit chip to operate at a corresponding operating voltage when the integrated circuit chip is operating at a specific temperature. The continuous temperature-voltage function is calculated to cause each of the integrated circuit chips to individually satisfy (on average) various average power consumption goals.

This method also calculates, for each temperature/voltage combination of each of the selective voltage bins, a power consumption amount in item 608. This power consumption amount is based on the valid temperature/voltage combinations possible within each of the voltage bins.

In item 610, the integrated circuit chips are produced (manufactured using manufacturing equipment). This method then tests each integrated circuit chip at one or more designated temperatures and voltages in item 612 (using testing equipment operatively connected to a computerized device). Next, in item 614, once the integrated circuit chips are tested, this exemplary method can automatically sort the integrated circuit chips into the selective voltage bins according to performance and leakage goals based on the ring oscillator (timing delay test) results.

Once binned, in item 616, the method can then automatically record (in a memory of the integrated circuit chips) the selective voltage bin identifier and the temperature/voltage combinations corresponding to a combination of average power consumption goal and timing delay goal into which each of the integrated circuit chips has been sorted. During in-service operations each of the integrated circuit chips alters their current operating voltage continuously based on the current operating temperature and the temperature/voltage combinations in the memory. Thus, because of the different temperature/voltage combinations stored in the memory of the different integrated circuit chips, the operating voltage of the integrated circuit chip is continuously changed as the temperature of the integrated circuit chip changes, and such continuously changing operating voltage changes comply with previously established average power consumption goals and timing delay goals.

Further, such methods can then design a system with a continuously adjustable voltage regulator in item 620 based on the different temperature/voltage combinations found in item 606. This system from item 620 can then be used to set the system voltage based on the selective voltage bin and temperature using the temperature/voltage combinations (in item 628).

In addition, the methods herein can determine a percentage of the integrated circuit chips that were sorted into each of the voltage bins (item 622), and evaluate the system application to determine the amount of time each of the integrated circuit chip will be operating at each operating voltage (item 624). With this information and the allowed temperature/voltage combination for each planned bin (item 608), the methods herein can calculate average system power consumption of all chips manufactured according to the integrated circuit design (or within a certain voltage bin) in item 626. The average system power found in item 626 is based on the product of the percentage of integrated circuit chips sorted into each of the voltage bins, the amount of time each of the integrated circuit chip will be operating at each operating voltage, and the power consumption amount of each operating voltage of each of the voltage bins.

Then, the system voltage is set based on selective voltage bin identifier and temperature. During power up, each integrated circuit product uses the highest allowed voltage. Temperature in the product is measured and if the temperature changes, the operating voltage potentially changes.

When the product has a high activity (high switching factor), temperature increases. When the high activity increases the temperature above a designated temperature, the voltage can be reduced to that identified by the continuous temperature-voltage function. Lower voltage results in lower static power (leakage) and lower dynamic power. When the activity is lower, the temperature will be lower. When temperature is lowered, a higher voltage is needed to maintain system performance. For each selective voltage bin, system average power is the weight average of the power at each temperature and the time the system is at each of the temperatures. Without this technique, voltage would remain at the higher voltage (and higher power) at all times. Applying different voltages for higher and lower temperatures reduces average system power.

Figure 15:
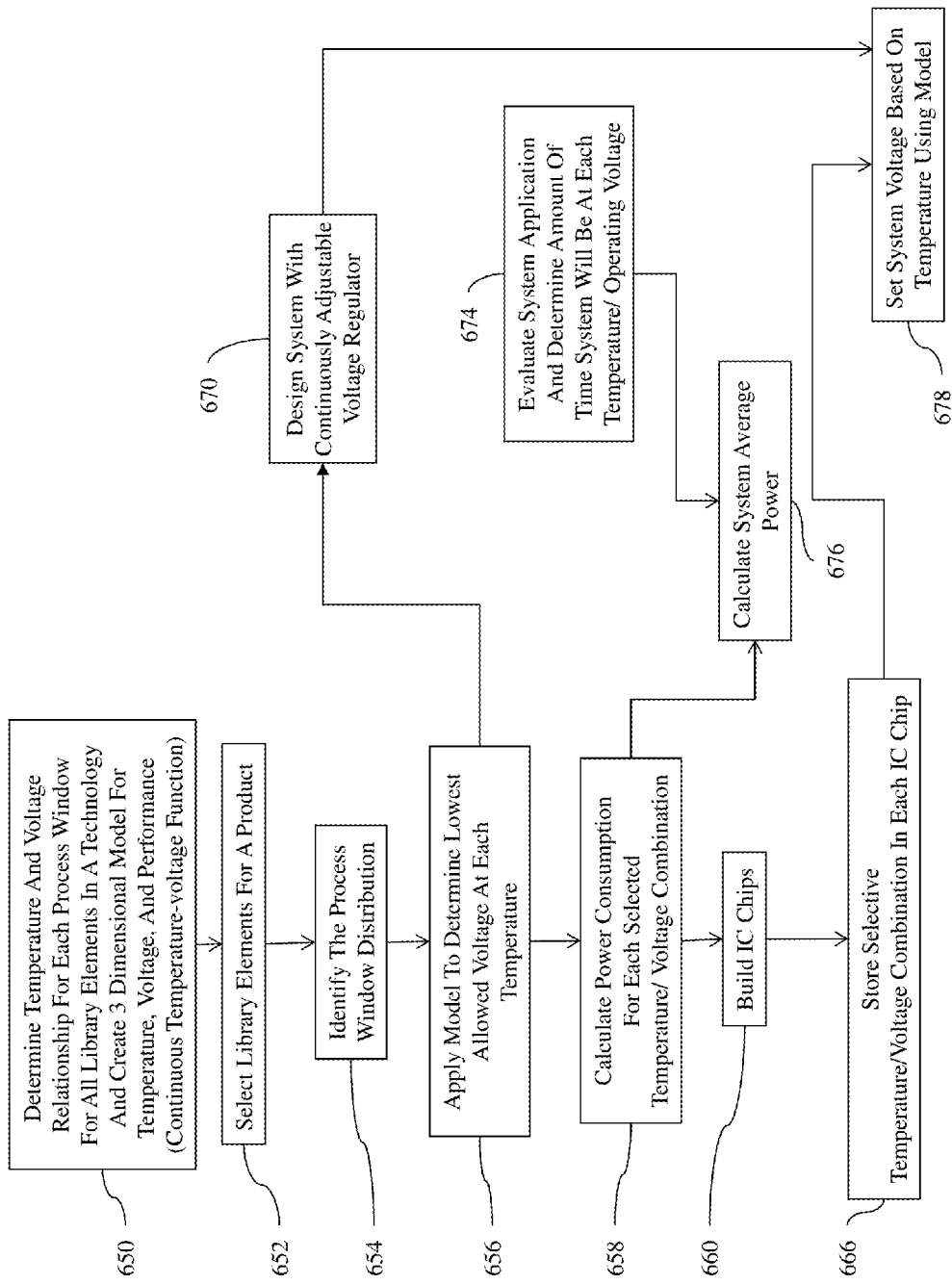
FIG. 15 is a flowchart illustrating a method of systems and methods herein.

FIG. 15 is similar to FIG. 14, but illustrates a process that does not involve selective voltage binning. Thus, the method shown in FIG. 15 begins by determining the temperature and voltage relationship for many different process windows for all library elements in a technology in order to create a three-dimensional model for temperature, voltage, and performance, which is sometimes referred to herein as a continuous temperature-voltage function (item 650). The integrated circuit chips produced according to such a technology may exhibit temperature inversion, meaning such chips have decreasing timing delay (such chips speed up) as operating temperature increases.

Then, in item 652, the method selects library elements for a design of a product (such as an integrated circuit chip). Additionally, in item 654, the method identifies the process window distribution (performance characteristics) of the integrated circuit chip. The different performance characteristics can include, for example, an allowed timing delay (operating speed) range, an allowed operating temperature range, etc. The method also applies the continuous temperature-voltage function to the performance characteristics to determine the minimum operating voltage for each allowed operating temperature (in item 656). Thus, item 656 applies the continuous temperature-voltage function to the performance characteristics to determine a plurality of temperature/voltage combinations. Each of the temperature/voltage combinations comprises an operating voltage for each allowed operating temperature within the allowed temperature range of the integrated circuit chips. The temperature/voltage combinations direct each integrated circuit chip to operate at a corresponding operating voltage when the integrated circuit chip has a specific temperature. The continuous temperature-voltage function is calculated to cause each of the integrated circuit chips to individually satisfy (on average) various average power consumption goals.

This method also calculates, for each temperature/voltage combination, a power consumption amount in item 658. This power consumption amount is based on the valid temperature/voltage combinations possible for the integrated circuit chip. In item 660, the integrated circuit chips are produced (manufactured using manufacturing equipment). In item 666, the method can then automatically record (in a memory of the integrated circuit chips) the temperature/voltage combinations corresponding to a combination of average power consumption goal and timing delay goal.

During in-service operations each of the integrated circuit chips alters their current operating voltage continuously based on the current operating temperature and the temperature/voltage combinations in the memory. Thus, because of the different temperature/voltage combinations stored in the memory of the different integrated circuit chips, the operating voltage of the integrated circuit chip is continuously changed as the temperature of the integrated circuit chip changes, and such continuously changing operating voltage changes comply with previously established average power consumption goals and timing delay goals.

Further, such methods can then design a system with a continuously adjustable voltage regulator in item 670 based on the different temperature/voltage combinations found in item 656. This system from item 670 can then be used to set the system voltage based on the temperature using the temperature/voltage combinations (in item 678).

In addition, the methods herein can evaluate the system application to determine the amount of time each of the integrated circuit chip will be operating at each operating voltage (item 674). With this information and the allowed temperature/voltage combination for each planned bin (item 658), the methods herein can calculate average system power consumption of all chips manufactured according to the integrated circuit design in item 676. The average system power found in item 676 is based on the product of the amount of time each of the integrated circuit chip will be operating at each operating voltage, and the power consumption amount of each operating voltage.

As will be appreciated by one skilled in the art, aspects of the systems and methods herein may be embodied as a system, method or computer program product. Accordingly, aspects of the present disclosure may take the form of an entirely hardware system and method, an entirely software system and method (including firmware, resident software, micro-code, etc.) or an system and method combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to systems and methods herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 16:
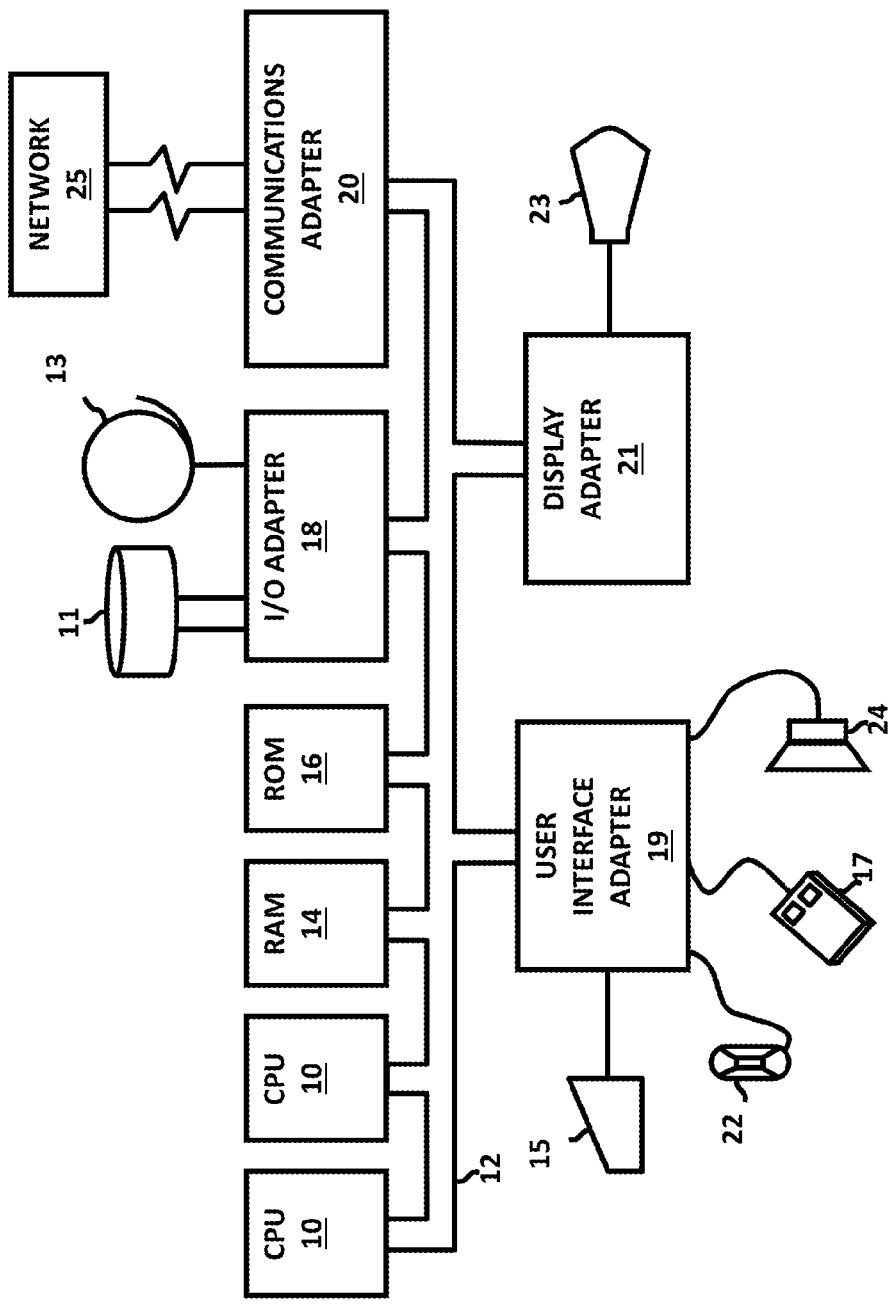
FIG. 16 is a schematic diagram of a hardware system according to systems and methods herein.

A representative hardware environment for practicing the systems and methods herein is depicted in FIG. 16. This schematic drawing illustrates a hardware configuration of an information handling/computer system in accordance with the systems and methods herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the systems and methods herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Deployment types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, and then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 17:
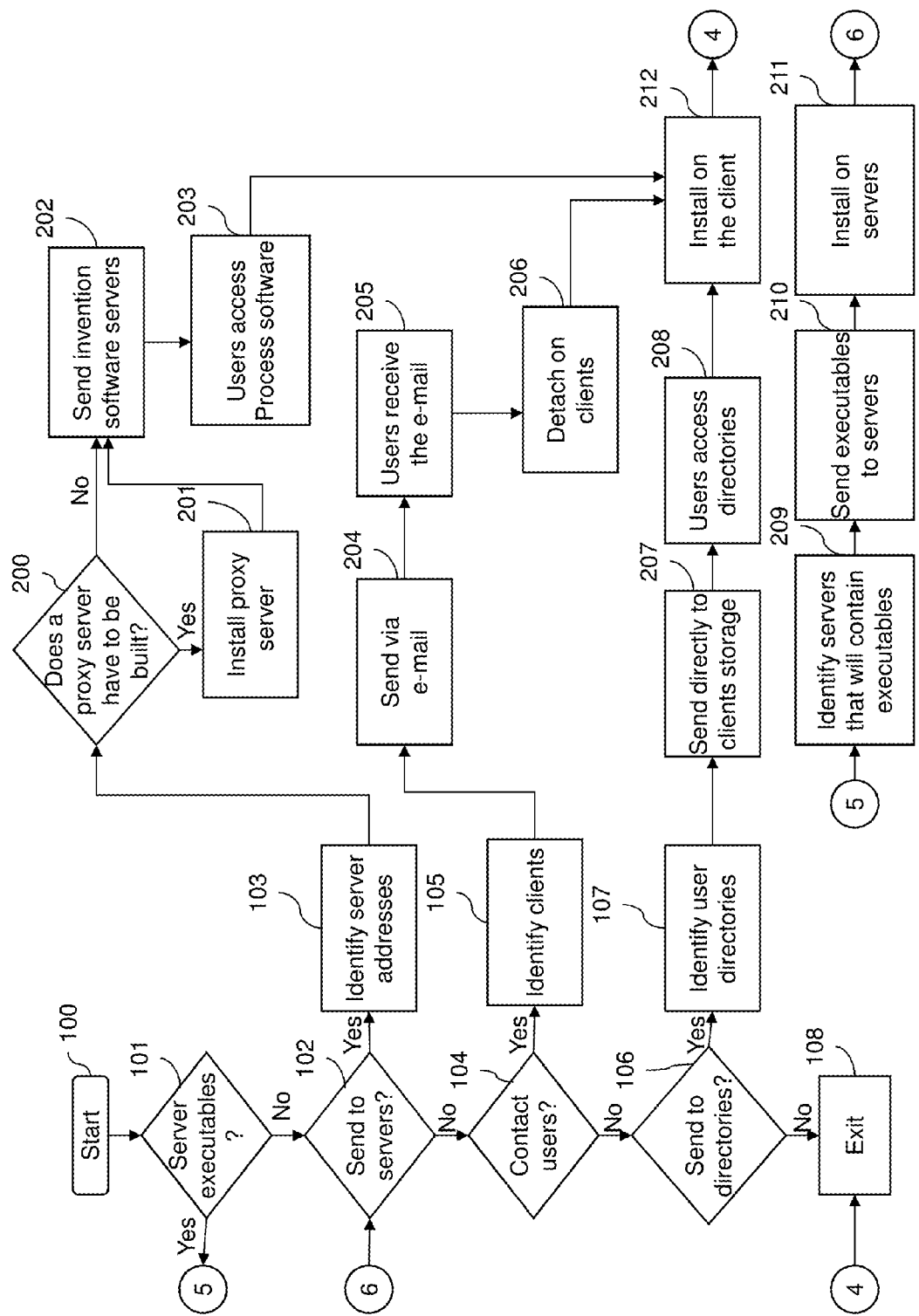
FIG. 17 is a schematic diagram of a deployment system according to systems and methods herein.

In FIG. 17, Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying through the use of a shared file system 210. The process software is then installed on the servers 211.

Next, a determination is made on whether the process software is to be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another system and method would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another system and method is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether to the process software will be sent directly to user directories on their client computers 106. If so, the user directories are identified 107. The process software is transferred directly to the user's client computer directory 207. This can be done in several ways such as, but not limited, to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 18:
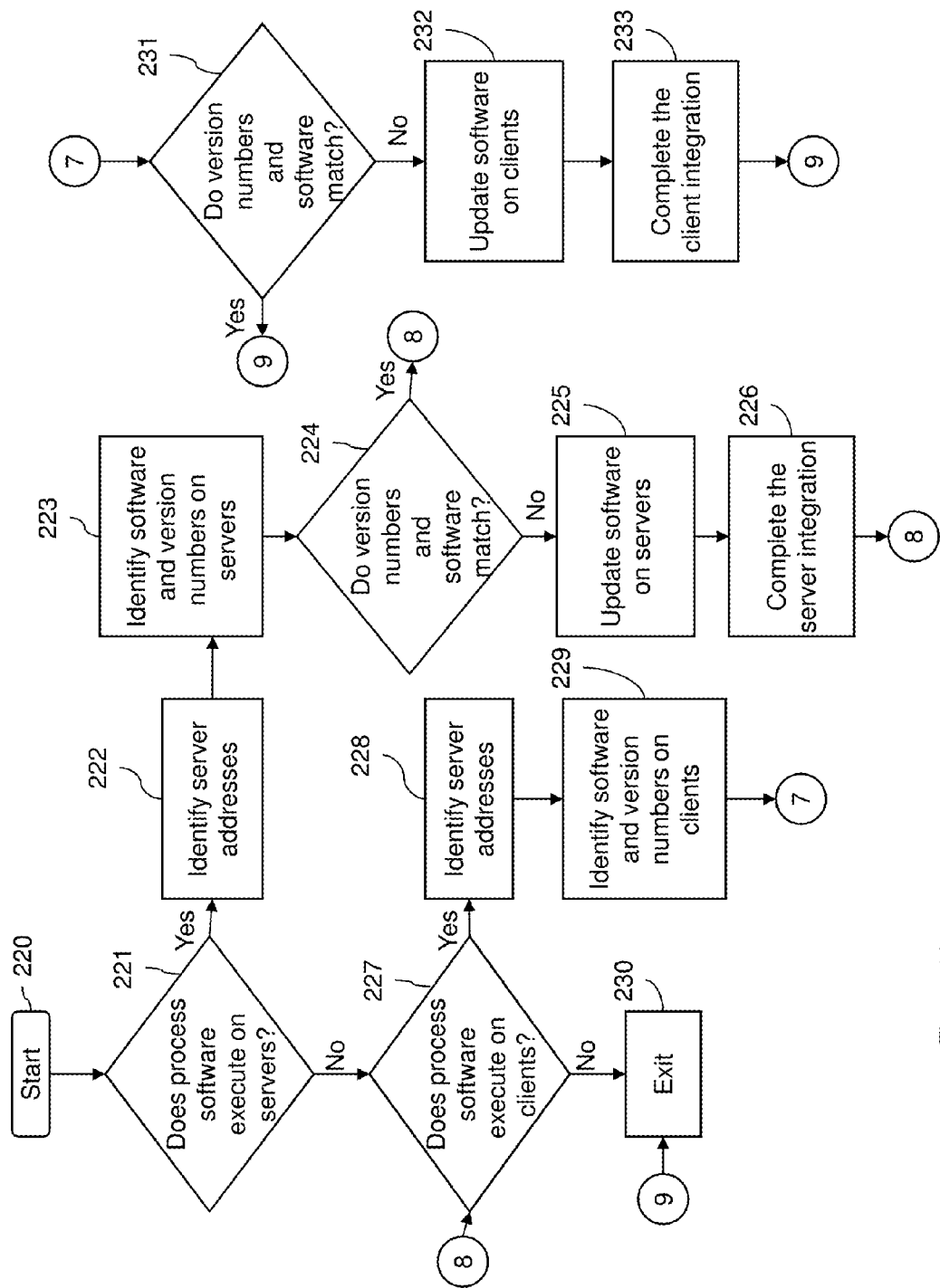
FIG. 18 is a schematic diagram of an integration system according to systems and methods herein.

In FIG. 18, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally, if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another system and method, the service provider requests payment directly from a customer account at a banking or financial institution. In another system and method, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another system and method, the service provider requests payment directly from a customer account at a banking or financial institution.

In another system and method, if the service provider is also a customer of the customer that uses the process software application, the payment owed to the service provider is reconciled to the payment owed by the service provider to minimize the transfer of payments.

Figure 19:
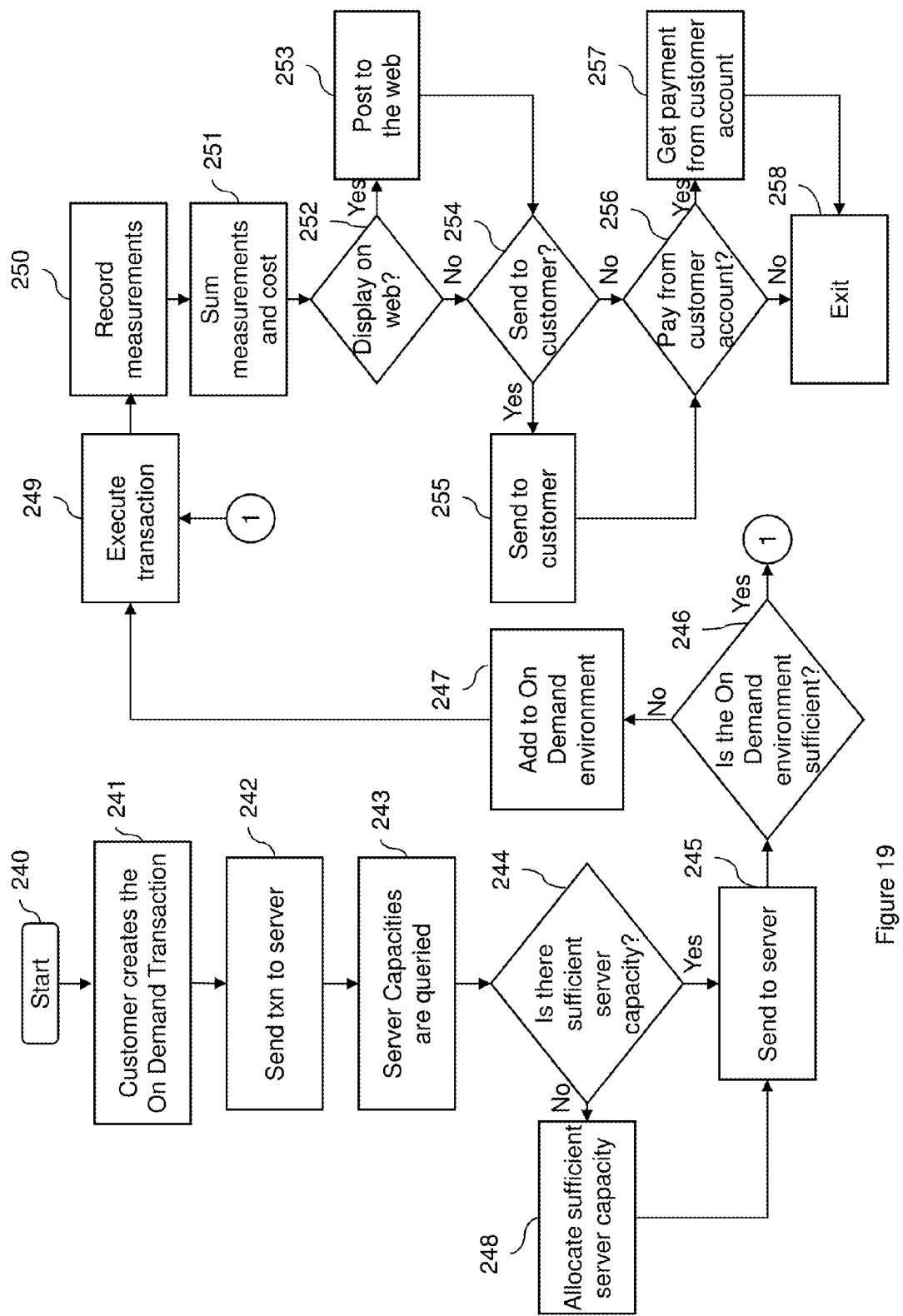
FIG. 19 is a schematic diagram of an on demand system according to systems and methods herein.

In FIG. 19, Step 240 begins the On Demand process. A transaction is created than contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is to exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 20:
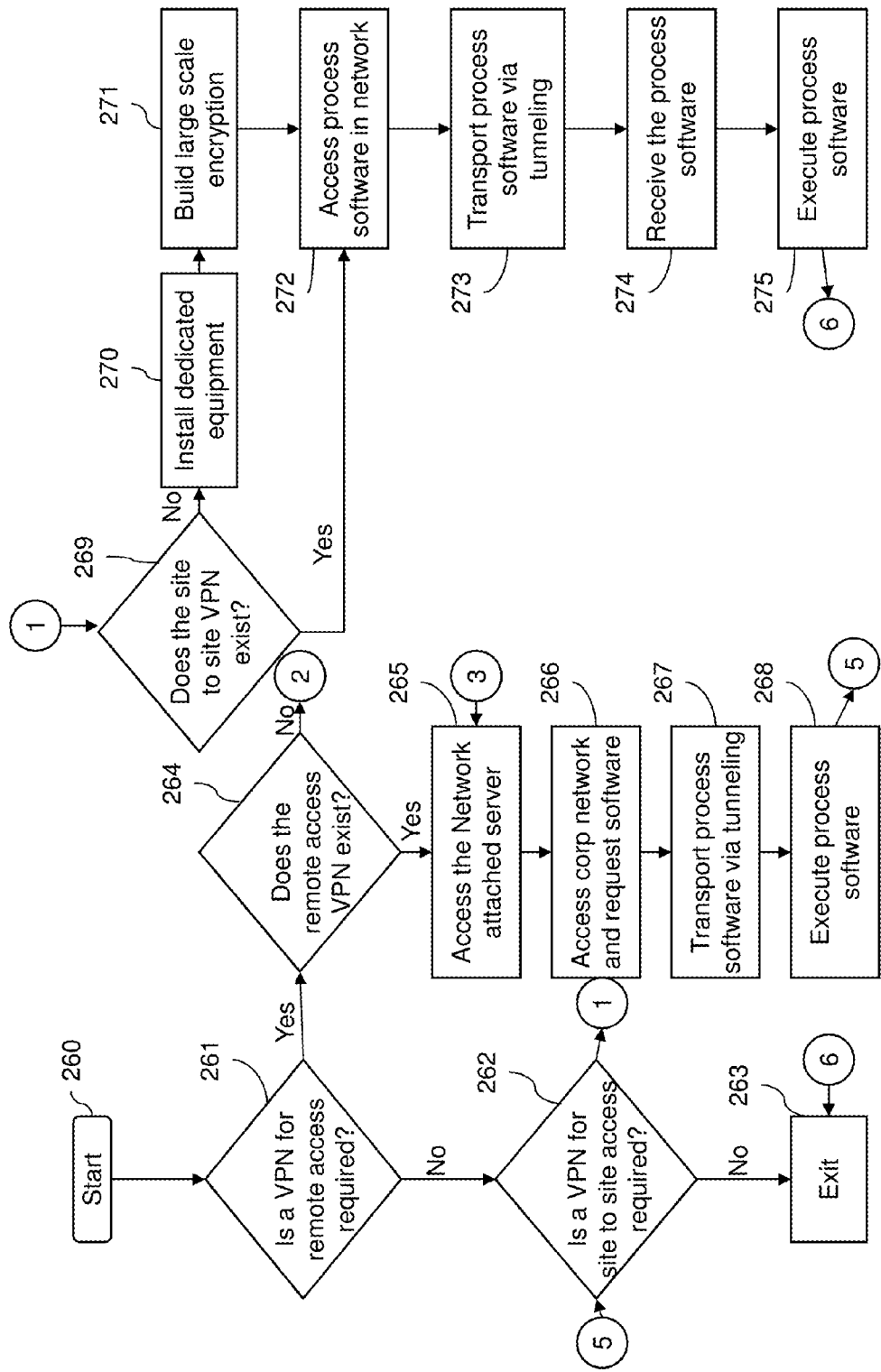
FIG. 20 is a schematic diagram of a virtual private network system according to systems and methods herein.
Figure 21:
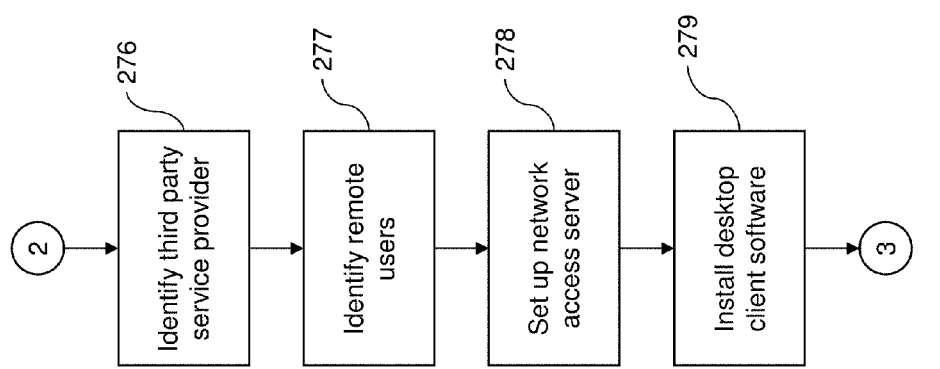
FIG. 21 is a schematic diagram of a virtual private network system according to systems and methods herein.

In FIGS. 20 and 21, Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling 273. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular systems and methods only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various systems and methods of the present invention have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

What is claimed is:

1. A method comprising:
    determining temperature and voltage relationships for integrated circuit library elements to create a continuous temperature-voltage function, using a computerized device;
    combining ones of said library elements to form an integrated circuit design, using said computerized device;
    identifying performance characteristics for integrated circuit chips produced according to said integrated circuit design, said performance characteristics including an operating temperature range;
    applying said continuous temperature-voltage function to said performance characteristics to determine a plurality of temperature/voltage combinations, each of said temperature/voltage combinations comprising an operating voltage for each operating temperature within said operating temperature range;
    producing said integrated circuit chips using manufacturing equipment operatively connected to said computerized device; and
    recording in memory of said integrated circuit chips said temperature/voltage combinations,
    further comprising:
        calculating, for each of said temperature/voltage combinations, a power consumption amount using said computerized device;
        determining an amount of time each of said integrated circuit chip will be operating at each different operating voltage, using said computerized device; and
        calculating an average system power, using said computerized device, based on:
            said amount of time each of said integrated circuit chip will be operating at each said different operating voltage; and
            said power consumption amount at each said different operating voltage.

2. The method according to claim 1, each of said integrated circuit chips altering a current operating voltage during in-service operations based on a current operating temperature and said temperature/voltage combinations in said memory.

3. The method according to claim 1, a total power consumption of each of said integrated circuit chips comprises a sum of dynamic power consumption and static power consumption.

4. A method comprising:
    determining temperature and voltage relationships for integrated circuit library elements to create a continuous temperature-voltage function, using a computerized device;
    combining ones of said library elements to form an integrated circuit design, using said computerized device;
    defining a number of voltage bins into which integrated circuit chips produced according to said integrated circuit design will be sorted, using said computerized device;
    identifying performance characteristics for each of said voltage bins, said performance characteristics including an operating temperature range;
    applying said continuous temperature-voltage function to said performance characteristics for each voltage bin to determine a plurality of temperature/voltage combinations for each said voltage bin, each of said temperature/voltage combinations comprising an operating voltage for each operating temperature within said operating temperature range of each of said voltage bins;
    producing said integrated circuit chips using manufacturing equipment operatively connected to said computerized device;
    testing each of said integrated circuit chips using testing equipment operatively connected to said computerized device;
    sorting said integrated circuit chips into said voltage bins based on said testing; and
    recording in memory of said integrated circuit chips said temperature/voltage combinations of a voltage bin of said voltage bins into which each of said integrated circuit chips has been sorted; and
    determining a percentage of said integrated circuit chips sorted into each of said voltage bins, using said computerized device.

5. The method according to claim 4, further comprising:
    calculating, for each of said temperature/voltage combinations of each of said voltage bins, a power consumption amount using said computerized device.

6. The method according to claim 4, further comprising determining an amount of time each of said integrated circuit chip will be operating at each different operating voltage, using said computerized device.

7. The method according to claim 6, further comprising calculating an average system power, using said computerized device, based on:
  said percentage of said integrated circuit chips sorted into each of said voltage bins;
  said amount of time each of said integrated circuit chip will be operating at each said different operating voltage; and
  said power consumption amount at each said different operating voltage of each of said voltage bins.

8. The method according to claim 4, each of said integrated circuit chips altering a current operating voltage during in-service operations based on a current operating temperature and said temperature/voltage combinations in said memory.

9. The method according to claim 4, a total power consumption of each of said integrated circuit chips comprises a sum of dynamic power consumption and static power consumption.

10. A method comprising:
  determining temperature and voltage relationships for integrated circuit library elements in a technology to create a three-dimensional model for temperature, voltage, and performance to produce a continuous temperature-voltage function, using a computerized device;
  combining ones of said library elements to form an integrated circuit design conforming with said technology, using said computerized device;
  defining a number of voltage bins into which integrated circuit chips produced according to said integrated circuit design will be sorted, using said computerized device;
  identifying performance characteristics for each of said voltage bins, said performance characteristics including an operating temperature range;
  applying said continuous temperature-voltage function to said performance characteristics for each voltage bin to determine a plurality of temperature/voltage combinations for each said voltage bin, each of said temperature/voltage combinations comprising a minimum operating voltage for each operating temperature within said operating temperature range of each of said voltage bins;
  calculating, for each of said temperature/voltage combinations of each of said voltage bins, a power consumption amount using said computerized device;
  producing said integrated circuit chips using manufacturing equipment operatively connected to said computerized device;
  testing each of said integrated circuit chips using testing equipment operatively connected to said computerized device;
  sorting said integrated circuit chips into said voltage bins based on said testing;
  recording in memory of said integrated circuit chips said temperature/voltage combinations of a voltage bin of said voltage bins into which each of said integrated circuit chips has been sorted; and
  determining a percentage of said integrated circuit chips sorted into each of said voltage bins, using said computerized device.

11. The method according to claim 10, further comprising determining an amount of time each of said integrated circuit chip will be operating at each different operating voltage, using said computerized device.

12. The method according to claim 11, further comprising calculating an average system power, using said computerized device, based on:
  said percentage of said integrated circuit chips sorted into each of said voltage bins;
  said amount of time each of said integrated circuit chip will be operating at each said different operating voltage; and
  said power consumption amount at each said different operating voltage of each of said voltage bins.

13. The method according to claim 10, each of said integrated circuit chips altering a current operating voltage during in-service operations based on a current operating temperature and said temperature/voltage combinations in said memory.

14. The method according to claim 10, a total power consumption of each of said integrated circuit chips comprises a sum of dynamic power consumption and static power consumption.

15. A computer program product comprising a tangible computer readable storage medium having program code embodied therewith, the program code being readable/executable by a computer to perform a method comprising:
  determining temperature and voltage relationships for integrated circuit library elements to create a continuous temperature-voltage function, using a computerized device;
  combining ones of said library elements to form an integrated circuit design, using said computerized device;
  defining a number of voltage bins into which integrated circuit chips produced according to said integrated circuit design will be sorted, using said computerized device;
  identifying performance characteristics for each of said voltage bins, said performance characteristics including an operating temperature range;
  applying said continuous temperature-voltage function to said performance characteristics for each voltage bin to determine a plurality of temperature/voltage combinations for each said voltage bin, each of said temperature/voltage combinations comprising an operating voltage for each operating temperature within said operating temperature range of each of said voltage bins;
  producing said integrated circuit chips using manufacturing equipment operatively connected to said computerized device;
  testing each of said integrated circuit chips using testing equipment operatively connected to said computerized device;
  sorting said integrated circuit chips into said voltage bins based on said testing;
  recording in memory of said integrated circuit chips said temperature/voltage combinations of a voltage bin of said voltage bins into which each of said integrated circuit chips has been sorted; and
  determining a percentage of said integrated circuit chips sorted into each of said voltage bins, using said computerized device.

16. The computer program product according to claim 15, further comprising:
  calculating, for each of said temperature/voltage combinations of each of said voltage bins, a power consumption amount using said computerized device.

17. The computer program product according to claim 16, further comprising determining an amount of time each of said integrated circuit chip will be operating at each different operating voltage, using said computerized device.

18. The computer program product according to claim 17, further comprising calculating an average system power, using said computerized device, based on:
  said percentage of said integrated circuit chips sorted into each of said voltage bins;

said amount of time each of said integrated circuit chip will be operating at each said different operating voltage; and said power consumption amount at each said different operating voltage of each of said voltage bins.

19. The computer program product according to claim 15, each of said integrated circuit chips altering a current operating voltage during in-service operations based on a current operating temperature and said temperature/voltage combinations in said memory.

20. The computer program product according to claim 15, a total power consumption of each of said integrated circuit chips comprises a sum of dynamic power consumption and static power consumption.

\* \* \* \* \*